UNITED STATES PATENT OFFICE.

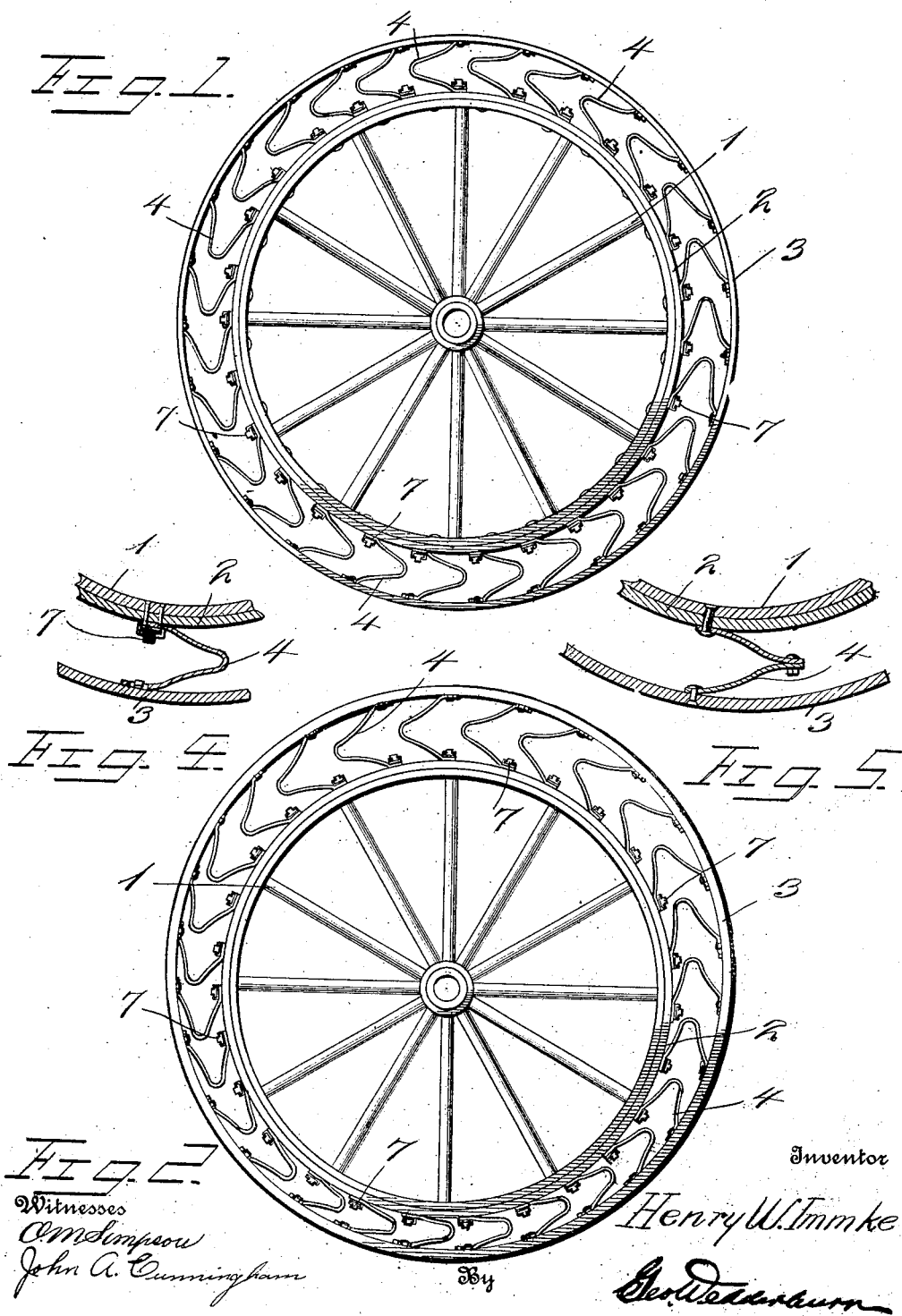

HENRY W. IMMKE, OF PRINCETON, ILLINOIS.

RESILIENT WHEEL.

1,177,628.  Specification of Letters Patent.  Patented Apr. 4, 1916.

Application filed May 13, 1911. Serial No. 626,935.

*To all whom it may concern:*

Be it known that I, HENRY W. IMMKE, citizen of the United States, residing at Princeton, in the county of Bureau and State of Illinois, have invented certain new and useful Improvements in Resilient Wheels, of which the following is a specification.

My invention relates to certain improvements in the construction of rims for wheels of the class more particularly applicable to automobiles and bicycles.

The object of my invention is to provide a rim for automobiles and other wheels that will act as a substitute for pneumatic or cushion tires and one that will afford the greatest amount of resiliency and at the same time be inexpensive and durable. In carrying out this object I construct my rim in two parts, one part forming the tread portion and the other part, of somewhat smaller diameter than the tread portion, forming the felly of the wheel. Between the felly and the tread portion I introduce a plurality of circumferentially extending spring members so arranged that the slightest vibration or jar occasioned by an uneven surface of the ground over which it is intended to travel, will be dissipated through the agency of the spring members. These resilient members are so constructed that they will flexibly respond to the slightest resistance in both a vertical and horizontal plane.

Another object of my invention is to provide the said spring members with rubber stops or bumpers, so that in the event of a violent impact of the wheel against an uneven surface the said stops will prevent the spring members from entirely collapsing and thus lessen the probability of snapping or breaking same when an unforeseen strain is exerted thereon.

A further object of my invention is to provide for an independent horizontal movement of the spring with relation to the tread.

Figure 1 illustrates in elevation a wheel embodying my invention; Fig. 2 illustrates a similar view showing the spring compressed as when carrying a load, Fig. 3 illustrates an enlarged detail of one of the spring members in operative position, Fig. 4 illustrates an enlarged detail of a modified form of one of the spring members attached.

Similar numerals of reference are employed to indicate corresponding parts throughout the several views wherein the numeral 1 denotes a wheel of the conventional type, to the rim of which is securely bolted the outer rim 2. Arranged at convenient intervals between the outer rim 2 and the tread 3, are a plurality of circumferentially extending spring members 4, the spring members are preferably bell shaped as shown in Figs. 1, 2, 3 and 4. One end of the spring members is rigidly mounted on the outer rim 2 of the wheel 1, the other ends of said members are adjustably mounted on the tread 3, as clearly illustrated in Fig. 3. This arrangement is to provide additional relief against any undue strain and at the same time to afford greater facility of adjustment to varying weights imposed upon the wheel. Rubber knobs or bumpers 7 are provided and mounted on the stationary end of the spring 4, for the obvious purpose of preventing the spring from collapsing under excessive weight or in case of sudden and violent impact of the wheel against an uneven surface.

Having described my invention that which I claim and desire to protect by Letters Patent is:—

A resilient tire for vehicles, comprising a rim secured to the rim of a wheel, a tread surrounding said rim, a plurality of circumferentially extending spring members interposed between said rim and tread with one end fixed and the other end mounted for limited freedom of movement, the two ends of each spring being disposed substantially radially of the wheel and each spring member being substantially U-shaped with the bends thereof all extending in the same direction circumferentially of the wheel, and resilient bumpers retained by the securing means on the fixed ends of said springs, said bumpers extending radially toward the adjustably mounted ends of said springs.

In testimony whereof I affix my signature in presence of two witnesses.

HENRY W. IMMKE.

Witnesses:
PEARL LAFFERTY,
C. T. PAMP.